United States Patent
Albert et al.

(10) Patent No.: US 7,674,853 B2
(45) Date of Patent: Mar. 9, 2010

(54) PROCESS FOR MAKING A PIPA-POLYOL

(75) Inventors: Verhelst Gabriel Albert, Boortmeerbeek (BE); Yu Jianming, Shanghai (CN)

(73) Assignee: Huntsman International LLC, The Woodlands, TX (US)

( * ) Notice: Subject to any disclaimer, the term of this patent is extended or adjusted under 35 U.S.C. 154(b) by 0 days.

(21) Appl. No.: 11/786,221

(22) Filed: Apr. 11, 2007

(65) Prior Publication Data

US 2007/0265411 A1 Nov. 15, 2007

Related U.S. Application Data

(63) Continuation of application No. PCT/EP2005/054763, filed on Sep. 23, 2005.

(30) Foreign Application Priority Data

Oct. 15, 2004 (EP) .................................. 04105091

(51) Int. Cl.
*C08G 18/30* (2006.01)
(52) U.S. Cl. ........................ 524/762; 521/126; 521/127; 521/137; 521/167; 524/377; 524/507; 528/75; 528/77
(58) Field of Classification Search ................. 521/126, 521/127, 137, 167; 524/377, 762, 507; 528/75, 528/77
See application file for complete search history.

(56) References Cited

U.S. PATENT DOCUMENTS

| 4,208,314 | A | 6/1980 | Priest et al. |
| 4,374,209 | A | 2/1983 | Rowlands |
| 4,438,252 | A | 3/1984 | Carroll et al. |
| 4,452,923 | A | 6/1984 | Carroll et al. |
| 4,554,306 | A | 11/1985 | Carroll |
| 5,068,280 | A | 11/1991 | Pal et al. |
| 5,292,778 | A | 3/1994 | Van Veen et al. |
| 5,916,994 | A | 6/1999 | Izukawa et al. |
| 6,881,783 | B1 | 4/2005 | Verhelst et al. |

FOREIGN PATENT DOCUMENTS

| EP | 418039 B1 | 4/1996 |
| GB | 2072204 | 9/1981 |
| GB | 2102822 | 2/1983 |
| WO | WO 94/12553 | 6/1994 |
| WO | WO 00/73364 | 12/2000 |

*Primary Examiner*—Elvis O Price
(74) *Attorney, Agent, or Firm*—Ron D. Brown; Rhonda L. Sheldon

(57) ABSTRACT

Process for preparing a polyol comprising particulate material in dispersed form by reacting an MDI-based polyisocyanate and a polyol having an equivalent weight of up to 400 in a relative amount such that the number of NCO-groups is 70-100% of the number of OH-groups in said polyol having an equivalent weight of up to 400, the reaction being carried out in a polyol having an equivalent weight of 500 or more. The polyols are claimed as well.

6 Claims, No Drawings

PROCESS FOR MAKING A PIPA-POLYOL

CROSS-REFERENCE TO RELATED APPLICATIONS

This application is a continuation of international application PCT EP2005/054763, filed Sep. 23, 2005, which claims priority to EP 04105091.5, filed Oct. 15, 2004, both of which applications are hereby incorporated by reference.

BACKGROUND

The present invention is concerned with a process for preparing PIPA polyols.

PIPA (polyisocyanate polyaddition) polyols have been disclosed before, see e.g. U.S. Pat. Nos. 4,452,923, 4,438,252, 4,554,306, GB 2102822, GB 2072204, WO 94/12553, U.S. Pat. No. 5,292,778 and EP 418039. PIPA polyols are polyaddition reaction products of a polyisocyanate and a low molecular weight compound having a plurality of hydroxyl, primary amine and/or secondary amine groups in the presence of high molecular weight polyols, in particular polyether polyols. The PIPA polyol is a dispersion of particulate material in a polyol and is used e.g. in making slabstock or moulded flexible foams with improved load-bearing properties. The amount of PIPA polyol used in formulations for making such foams conventionally is such that the amount of particulate material calculated on all high molecular weight polyol used in the formulation is 1-15% by weight. The most commonly used PIPA polyol nowadays probably is a PIPA polyol having about 20% by weight of particulate material, which is diluted with further high molecular weight polyol to the above 1-15% by weight loading range.

It would be desirable to be able to provide PIPA polyol with a considerably higher loading. It would allow the foam producer to use PIPA polyol with higher loadings for making the foam. Even if the foam producer would dilute the PIPA polyol with a higher loading, it would have the advantage that the PIPA polyol can be transported in a more concentrated form and can be diluted at the place where it is needed and to the extent needed. Further it provides the polyurethane systems' formulator with less formulation restrictions. The foams made from such PIPA polyols show good fire retardancy properties and are easily recyclable chemically.

Processes for making such PIPA polyols with a higher loading are known, see e.g. the prior art mentioned before. However, these processes lead to products which have a high viscosity and/or are not stable or these processes lead, certainly at a larger scale, to an uncontrollable reaction which gives PIPA polyols which could cause foam collapse when used in making flexible polyurethane foams.

In WO 00/73364 a process is described for preparing a PIPA-polyol having a loading of 30-80% by weight and a relatively low viscosity. The $T_g$ (glass transition temperature) of such PIPA polyols is relatively low and the amount of particles having a particle size of 10 µm and more is rather high, leading to lower storage stability. When used in making flexible foams such PIPA polyols give a cell opening effect which often is too strong and a reinforcing effect which is too low; further the compression set and the fire performance of the foam would need improvement.

The PIPA polyol obtained in the example of WO 00/73364 had a solids content of 50% by weight and a viscosity of 15000 mPa·s at 25° C. The $T_g$ of the particulate material, however, was only 68° C. and up to 15% by volume of the particles had a particle size of more than 10 µm.

Surprisingly, a novel PIPA polyol was found having a higher $T_g$ of the particulate material and a higher volume of the particles having a particle size of 10 µm or less. Such a novel PIPA polyol is made by a combination of measures: 1) the ratio of isocyanate groups and isocyanate-reactive groups in the low molecular weight polyol was increased (in the example of WO 00/73364 this ratio was 61/100 while in the specification a range of 33-99/100 and preferably of 50-80/100 has been proposed; in the process according to the present invention this ratio is 70-100/100 and preferably 75-98/100); 2) emulsification of the polyol having a high molecular weight and the isocyanate-reactive compound having a low molecular weight preferably is conducted at a lower temperature (in WO 00/73364 a temperature of 60-100° C. and preferably of 70-95° C. has been disclosed and 82-85° C. was employed in the example and in the present invention preferably 20-70° C. is employed); 3) temperature control according to the following during the entire process the temperature may not exceed 150° C.;

during the entire process the temperature may not exceed 120° C. for more than 2 hours and preferably for not more than one hour;

during the addition of the polyisocyanate the temperature is kept at least 10° C. and preferably at least 20° C. and most preferably at least 30° C. above the $T_g$ of the PIPA particle formed at that stage of the process; and finally 4) the addition time of the polyisocyanate preferably is kept as short as possible and is determined by the cooling capacity available so as to keep the temperature within the above given limitations.

In this respect it is to be realised that the $T_g$ of the PIPA particles increases with the amount of polyisocyanate added almost linearly to about 75-110° C. at the end of the addition.

As such, reinforced polyols having a higher Tg have been disclosed.

For instance U.S. Pat. No. 5,916,994 and U.S. Pat. No. 4,208,314 disclose polymer polyols based on styrene and acrylonitrile (SAN) having a Tg of about 100° C. However, so far no such PIPA polyols have been disclosed. In addition, a narrow particle distribution and a high amount of small particles in the past could most of the time only be obtained following mechanical filtration. The present invention provides for a PIPA polyol with a high $T_g$ and a high amount of small particles without the need of such mechanical filtration.

BRIEF SUMMARY

Therefore, the present invention is concerned with a polyol composition comprising particulate material in dispersed form in a polyol having an average equivalent weight of 500 or more and in an amount of 35-80% by weight and preferably of 40-60% by weight calculated on the total polyol composition, this composition having a viscosity of 1500-25000 mPa·s at 25° C. and the particulate material comprising reaction products of a polyol having an average equivalent weight of up to 400 and of diphenylmethane diisocyanate optionally comprising homologues thereof having an isocyanate functionality of 3 or more and/or modified variants of such polyisocyanates, the particulate material having a glass transition temperature of at least 75° C. and at least 90% by volume of the particulate material having a particle size of 10 µm or less.

DETAILED DESCRIPTION

The present invention is concerned with a polyol composition comprising particulate material in dispersed form in a polyol having an average equivalent weight of 500 or more and in an amount of 35-80% by weight and preferably of 40-60% by weight calculated on the total polyol composition, this composition having a viscosity of 1500-25000 mPa·s at 25° C. and the particulate material comprising reaction products of a polyol having an average equivalent weight of up to 400 and of diphenylmethane diisocyanate optionally comprising homologues thereof having an isocyanate functionality of 3 or more and/or modified variants of such polyisocyanates, the particulate material having a glass transition temperature of at least 75° C. and at least 90% by volume of the particulate material having a particle size of 10 µm or less.

Such a glass transition temperature (Tg) is determined by Differential Scanning Calorimetry (DSC) measurements which are carried out over a −20° C. to 200° C. temperature range with a heating rate of 10° C./min. The Tg value is recorded at the inflection point of the heat capacity jump. Preferably, the polyol composition has a glass transition temperature of at least 80° C.

The viscosity is measured using a Brookfield Viscometer, model DV-II with a spindle CP-41.

Further, the polyol composition according to the present invention preferably comprises particulate material of which at least 95% by volume has a particle size of 10 µm or less (particle size is measured using a Mastersizer 2000, from Malvern Instruments, equipped with a Hydro 2000/s dispersion accessory, using methanol as eluent) and most preferably at least 95% by volume has a particle size of 5 µm or less. The content of particulate material is the sum of the amount of polyisocyanate and the amount of polyol having an equivalent weight of up to 400 used in making the polyol composition according to the present invention and is calculated by the following formula:

$$\frac{\left(\begin{array}{c}\text{weight of polyisocyanate} + \\ \text{weight of polyol with eq. weight of up to 400}\end{array}\right)100}{\text{total weight of the polyol composition}}, \% \text{ w.}$$

It will be clear that in this calculation it is assumed that all reacted product gives particulate material and that no polyisocyanate reacts with the other polyol(s).

Further, the present invention is concerned with a process for preparing the above polyol composition by emulsifying a polyol having an average equivalent weight of up to 400 (compound 2) in a polyol having an average equivalent weight of 500 or more (compound 1) at a temperature of 20-100° C. and preferably of 20-70° C., adding a polyisocyanate to the emulsion, optionally allowing the reaction mixture to mature for up to 2 hours, wherein the entire process is conducted under high shear mixing conditions, the temperature is kept below 150° C., the temperature may be allowed to become 120° C. or more for not more than 2 hours, the temperature is kept at least 10° C. higher than the $T_g$ of the particulate material formed at that stage, the used amount of compound 2 and polyisocyanate together at the end of the polyisocyanate addition is 35-80% by weight calculated on the weight of the polyol composition, and the number of isocyanate groups used per 100 isocyanate-reactive groups in compound 2 is 70-100 and preferably 75-98.

In the context of the present application the following terms have the following meaning:
1. The expression "polyurethane foam" as used herein generally refers to cellular products as obtained by reacting polyisocyanates with predominantly polyols, using foaming agents, and in particular includes cellular products obtained with water as reactive foaming agent (involving a reaction of water with isocyanate groups yielding urea linkages and carbon dioxide and producing polyurea-urethane foams).
2. The term "average nominal hydroxyl functionality" is used herein to indicate the number average functionality (number of hydroxyl groups per molecule) of the polyol composition on the assumption that this is the number average functionality (number of active hydrogen atoms per molecule) of the initiator(s) used in their preparations although in practice it will often be somewhat less because of some terminal unsaturation. The term "equivalent weight" refers to the molecular weight per isocyanate reactive hydrogen atom in the molecule.
3. The word "average" refers to number average unless indicated otherwise.

The polyol having an average equivalent weight of 500 or more preferably has an average equivalent weight of 1000-5000 and an average nominal hydroxy functionality of 2-6 (hereinafter referred to as compound 1) and may be selected from polyols known in the art. More preferably the polyols have an average equivalent weight of 1000-3000 and an average nominal hydroxy functionality of 2-4.

Compound 1 may be selected from polyether polyols, polyester polyols, polyesteramide polyols, polythioether polyols, polycarbonate polyols, polyacetal polyols and polyolefin polyols.

Polyether polyols, which may be used, include products obtained by the polymerization of a cyclic oxide, for example ethylene oxide, propylene oxide, butylene oxide or tetrahydrofuran in the presence of polyfunctional initiators.

Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, toluene diamine, diethyl toluene diamine, phenyl diamine, toluene diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, sorbitol and sucrose. Mixtures of initiators and/or mixtures of cyclic oxides may be used as well.

The polyether polyols preferably are those based on propylene oxide (PO) and/or ethylene oxide (EO). When they are based on both EO and PO, the amount of oxyethylene groups in the polyol may vary from 5-90% by weight, preferably 5-50% by weight and most preferably 5-25% by weight calculated on the weight of the polyol. If polyols are used comprising oxypropylene and oxyethylene groups, the polyols may be block copolymers, random copolymers and combinations thereof. A particularly preferred polyether polyol is a polyoxypropylene polyoxyethylene polyol having 5-25% by weight of oxyethylene units which are at the end of the polymer chains (so-called EO-tipped EO/PO polyols).

Polyester polyols which may be used include hydroxyl-terminated reaction products of polyhydric alcohols such as ethylene glycol, propylene glycol, diethylene glycol, 1,4-butanediol, neopentylglycol, 1,6-hexanediol, cyclohexane dimethanol, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polyesters obtained by the polymerization of lactones for example caprolactone, in conjunction with a polyol, or of hydroxy carboxylic acids such as hydroxy caproic acid, may also be used.

Polyesteramide polyols may be obtained by the inclusion of aminoalcohols such as ethanolamine in polyesterification mixtures.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerizing cyclic acetals.

Suitable polyolefin polyols include hydroxy-terminated butadiene homo- and copolymers and suitable polysiloxane polyols include polydimethylsiloxane diols and triols.

Preferably, polyether polyols or mixtures of polyether polyols are used as compound 1.

The polyol having an equivalent weight of up to 400 (hereinafter referred to as 'compound 2') preferably has an equivalent weight of up to 200 and may be selected from alkanolamines, low equivalent weight amine-initiated polyether polyols and low equivalent weight hydroxyl-terminated compounds such as ethylene glycol, glycerine, glycol ethers, pentaerythritol or mixtures thereof.

Suitable alkanolamines are di- and trialkanolamines, particularly those wherein the alkanol groups have from 2 to 6, preferably 2 to 3 carbon atoms.

The most preferred compound is triethanolamine.

The polyisocyanate used in making the PIPA polyol may be selected from diphenylmethane diisocyanates (MDI) optionally comprising homologues thereof having an isocyanate functionality of 3 or more (such diisocyanate comprising such homologues are known as crude MDI or polymeric MDI or mixtures of such crude or polymeric MDI with MDI) and modified variants of such MDI optionally comprising homologues thereof having an isocyanate functionality of 3 or more.

The diphenylmethane diisocyanate (MDI) used may be selected from 4,4'-MDI, 2,4'-MDI, isomeric mixtures of 4,4'-MDI and 2,4'-MDI and less than 10% by weight of 2,2'-MDI, and modified variants thereof containing carbodiimide, uretonimine, isocyanurate, urethane, allophanate, urea and/or biuret groups. Preferred are 4,4'-MDI, isomeric mixtures of 4,4'-MDI and 2,4'-MDI and less than 10% by weight of 2,2' MDI and uretonimine and/or carbodiimide modified MDI having an NCO content of at least 20% by weight and preferably at least 25% by weight and urethane modified MDI obtained by reacting excess MDI and polyol having a molecular weight of at most 1000 and having an NCO content of at least 20% by weight and preferably at least 25% by weight.

Diphenylmethane diisocyanate comprising homologues having an isoycanate functionality of 3 or more are so-called polymeric or crude MDI.

Polymeric or crude MDI are well known in the art. They are made by the phosgenation of a mixture of polyamines obtained by the acid condensation of aniline and formaldehyde.

The manufacture of both the polyamine mixtures and the polyisocyanate mixtures is well known. The condensation of aniline with formaldehyde in the presence of strong acids such as hydrochloric acid gives a reaction product containing diaminodiphenylmethane together with polymethylene polyphenylene polyamines of higher functionality, the precise composition depending in known manner inter alia on the aniline/formaldehyde ratio. The polyisocyanates are made by phosgenation of the polyamine mixtures and the various proportions of diamines, triamines and higher polyamines give rise to related proportions of diisocyanates, triisocyanates and higher polyisocyanates. The relative proportions of diisocyanate, triisocyanate and higher polyisoycanates in such crude or polymeric MDI compositions determine the average functionality of the compositions, that is the average number of isocyanate groups per molecule. By varying the proportions of starting materials, the average functionality of the polysiocyanate compositions can be varied from little more than 2 to 3 or even higher. In practice, however, the average isocyanate functionality preferably ranges from 2.3-2.8. The NCO value of these polymeric or crude MDI is at least 30% by weight. The polymeric or crude MDI contain diphenylmethane diisocyanate, the remainder being polymethylene polyphenylene polyisocyanates of functionality greater than two together with by-products formed in the manufacture of such polyisocyanates by phosgenation of polyamines. Further, modified variants of such crude or polymeric MDI may be used as well comprising carbodiimide, uretonimine, isocyanurate, urethane, allophanate, urea and/or biuret groups; especially the aforementioned uretonimine and/or carbodiimide modified ones and the urethane modified ones are preferred. Mixtures of polyisocyanates may be used as well.

The amount of polyisocyanate used is such that the number of isocyanate groups (NCO-groups) is 70-100% and preferably 75-98% of the hydroxy groups (OH-groups) in the compound 2. The amount of polyisocyanate and compound 2 together reflects the desired amount of particulate material in compound 1: if one wishes to prepare a polyol with 45% by weight of particulate material then the amount of polyisocyanate and compound 2 together is 45% by weight of the total composition (compound 1+compound 2+polyisocyanate).

The preparation of the polyol composition according to the present invention starts with the emulsification of compound 2 in compound 1. This is done by mixing the 2 polyols under high shear mixing conditions at a temperature of 20-100° C. and preferably of 20-70° C.

To the emulsion so obtained the polyisocyanate is added and allowed to react with compound 2. After addition of all polyisocyanate the mixture may be allowed to mature for up to 2 hours which in fact is giving the mixture more time to complete the reaction. This maturing step is conducted while high shear mixing at least until the temperature of the mixture is at least 10° C. under the $T_g$ of the particulate material and preferably at least 20° C. under the $T_g$ of the particulate material and most preferably at least 30° C. under the $T_g$ of the particulate material.

Subsequently mixing is discontinued and the polyol composition according to the present invention is allowed to cool to ambient temperature.

Once the polyisocyanate addition has started the following measures need to be taken:

High shear mixing conditions are maintained throughout the polyisocyanate addition.

The reaction between the polyisocyanate and compound 2 is exothermic. In order to avoid degradation the temperature may not exceed 150° C. and the temperature may not exceed 120° C. for more than 2 hours and preferably not for more than one hour. This may be achieved by appropriate cooling which may be conducted in conventional ways of cooling reactors. These measures are also maintained during the maturing step.

An important finding of the present invention is that the temperature needs to be kept above a certain minimum during the polyisocyanate addition: at least 10° C., preferably at least 20° C. and most preferably at least 30° C. above the $T_g$ of the particulate material formed at that stage of the process with the proviso that the maximum temperature restrictions prevail. At the start of the polyisocyanate addition the temperature should be above the melting point of all ingredients.

High shear mixing may be conducted in any known manner. A generally known way is to use a mixer equipped with a rotor and a stator at a speed which provides mixing and shearing.

The addition of the polyisocyanate may be conducted batchwise or continuously and it may be fast or slow. Preferably, the addition is as fast as possible and the speed of addition in fact is limited by the efficiency of the cooling equipment to keep the temperature below the maximum values. On the other hand, the addition preferably is not slower than the rate which ensures a reaction temperature of at least 10° C. above the $T_g$ of the particles formed at that stage.

In order to simplify the process control one could determine for a certain compound 1, compound 2, polyisocyanate and loading (amount of particles desired) the $T_g$ of the particles after for example a conversion of 20, 40, 60 and 80%. From this $T_g$ curve, a desirable reaction temperature curve can be chosen keeping the temperature restrictions in mind.

By appropriate adjustment of the polyisocyanate addition speed and the cooling capabilities such a temperature curve can then be followed. Process control of this type does not require more than normal process engineering skills and is daily routine for an average engineer. Based on this description and the examples, such engineers will be able easily to conduct the process according to the present invention.

In order to further reduce the viscosity of a PIPA polyol composition, it is preferred to use a small amount of water in the preparation of such polyol composition. When used, the amount of water is 0.1-5% by weight calculated on the total amount of the polyol composition and preferably 0.1-2% by weight calculated on the same basis. The water may be added at any stage but preferably it is added to compound 2 or the emulsion of compound 1 and 2.

The polyol compositions of the present invention are useful in making flexible polyurethane foams.

EXAMPLES

Ingredients used: Daltocel F-435 polyol (Daltocel is a trademark of Huntsman International LLC; Daltocel-F-435 polyol is a polyether polyol obtainable from Huntsman Polyurethanes); triethanolamine (99% pure, TELA), Suprasec 2020 polyisocyanate (obtainable from Huntsman Polyurethanes, Suprasec is a trademark of Huntsman International LLC) and Arcol™ 1342 polyol ex Bayer (a polyether polyol having a nominal hydroxy functionality of 3, and OH-value of 35 mg KOH/g and an EO-tip content of 14% by weight).

Example 1

The example of WO 00/73364 was repeated, the polyol (PIPA polyol 1) obtained had the following properties (see below Table 2).

Example 2

250 g of Arcol 1342 polyol was blended with 76 g of triethanolamine starting at 25° C. The mixture was then subjected to high shear mixing (all high shear mixing in example 2 and 3 was conducted with a Silverson L4RT, standard assembly, at 6000 rpm) for 5 minutes. At the end of the emulsification the temperature was 45° C. Subsequently, 174 g of Suprasec 2020 polyisocyanate was added dropwise over a period of 15 minutes while maintaining high shear mixing conditions (as above). The temperature rose gradually to 140° C. Then, high shear mixing was continued for 15 minutes and after that the mixing was stopped and the polyol composition was allowed to cool to ambient conditions. At the end of the high shear mixing, the was 90° C. The polyol had the following properties; see below Table 2; PIPA temperature polyol 2.

After addition of 25, 50, 75 and 100% of the MDI addition a sample was taken and the temperature of the reactor, the viscosity of the sample and the $T_g$ of the particulate material was determined. This was also done after the maturing step. The results are in Table 1.

TABLE 1

| MDI addition, % | Reactor Temperature, ° C. | Viscosity at 25° C., mPa · s | $T_g$, ° C. | $\Delta(T - T_g)$, ° C. |
|---|---|---|---|---|
| 25 | 50 | 10800 | −21 | 71 |
| 50 | 77 | 13000 | 26 | 51 |
| 75 | 107 | 13200 | 70 | 37 |
| 100 | 140 | 21700 | 100 | 40 |
| After maturing | 90 | 19500* | 101 | −11 |

*The maturing step not only provides for a more complete reaction but also prolonged high shear mixing leading to a slight viscosity improvement.

Example 3

2000 g of Arcol 1342 polyol was blended with 525 g of triethanolamine (TELA) and 20 g of water, followed by high shear mixing (as above) for 15 minutes starting at 25° C. At the end of the emulsification, the temperature was 45° C. 1455 g of Suprasec 2020 polyisocyanate was added dropwise over a period of 132 minutes while high shear mixing (the temperature rose to 140° C. at the end of the addition). High shear mixing was continued for 90 minutes. At the end of the high shear mixing, the temperature was 90° C. Then the mixing was discontinued and the polyol (PIPA polyol 3) was allowed to cool to ambient conditions. The temperature profile was kept similar to example 2 but over a time period of 132 minutes.

TABLE 2

| Properties | | | |
|---|---|---|---|
| PIPA polyol | 1 | 2 | 3 |
| Solids content, % w | 50 | 50 | 50 |
| Viscosity, mPa · s at 25° C. | 15000 | 19500 | 14600 |
| $T_g$, ° C. | 68 | 101 | 104 |
| Particles having particle size of 10 μm or less, % by volume | 85 | 100 | 99 |
| Ratio of NCO-groups over OH—groups in TELA | 61 | 80 | 96 |

1. The viscosity, $T_g$ and particle size distribution were measured as described hereinbefore.

2. Moulded foams, made using PIPA-polyols 1 and 2, showed the properties as in Table 3, also giving the other ingredients used (in parts by weight)

TABLE 3

| Foams | | |
|---|---|---|
| PIPA polyol 1 | 24.65 | — |
| PIPA polyol 2 | — | 24.65 |
| Daltocel F-435 polyol | 69.69 | 69.69 |
| Dabco ™ DC 5043 catalyst (Air Products) | 0.96 | 0.96 |
| Dabco ™ 8154 catalyst (Air Products) | 0.41 | 0.41 |
| Diethanolamine | 1.16 | 1.16 |
| Dimethylaminopropylamine | 0.11 | 0.11 |
| Niax ™ A1 catalyst (Osi Specialties) | 0.05 | 0.05 |
| Water | 2.97 | 2.97 |
| Toluenediisocyanate + Suprasec 2185 polyisocyanate (Huntsman Polyurethanes); 80/20 w/w | 39.36 | 39.36 |
| Core density, kg/m³, ISO 845 | 43.6 | 44.3 |
| Compression Load Deflection at 40%, ISO 3386-1 | 4.5 | 5.3 |
| Compression set, % | | |
| Dry - 75%, ISO 1856 method A | 5.5 | 4.1 |
| Humid - 50%, ISO 1856 method B | 18.4 | 11.2 |
| Humid aged compression set at 75%, ISO 1856 | 59 | 27 |

What is claimed:

1. Process for preparing a polyol composition having a viscosity of 1500-25000 mPa·s at 25° C., a glass transition temperature of at least 80° C. and at least 90% by volume of the particulate material has a particle size of 10 μm or less, by emulsifying a polyol having an average equivalent weight of up to 400 in a polyol having an average equivalent weight of 500 or more at a temperature of 20-70° C., adding a polyisocyanate to the emulsion, wherein the entire process is conducted under high shear mixing conditions, the temperature is kept below 150° C., the temperature may be allowed to become 120° C. or more for not more than 2 hours, the temperature is kept at least 20° C. higher than the $T_g$ of the particulate material formed at that stage, the used amount of the polyol having an average equivalent weight of up to 400 and polyisocyanate together at the end of the polyisocyanate addition is 35-80% by weight calculated on the weight of the polyol composition, and the number of isocyanate groups used per 100 isocyanate-reactive groups in the polyol having an average equivalent weight of up to 400 is 75-98.

2. Process according to claim 1 wherein an amount of water is used which ranges from 0.1 to 5% by weight calculated on the total amount of the polyol composition.

3. Process according to claim 1 wherein the reaction mixture is allowed to mature for up to 2 hours after the polyisocyanate addition.

4. Process according to claim 2 wherein the reaction mixture is allowed to mature for up to 2 hours after the polyisocyanate addition.

5. Process according to claim 1 wherein the amount of particulate material is 40-60% by weight, the polyol having an equivalent weight of 500 or more is a polyether polyol having an equivalent weight of 1000-5000 and an average nominal hydroxy functionality of 2-6 and wherein the polyol having an equivalent weight of up to 400 is an alkanolamine wherein the alkanol groups have 2-6 carbon atoms.

6. Process according to claim 2 wherein the amount of particulate material is 40-60% by weight, the polyol having an equivalent weight of 500 or more is a polyether polyol having an equivalent weight of 1000-5000 and an average nominal hydroxy functionality of 2-6 and wherein the polyol having an equivalent weight of up to 400 is an alkanolamine wherein the alkanol groups have 2-6 carbon atoms.

* * * * *